(12) United States Patent
Lacroix et al.

(10) Patent No.: US 8,567,852 B2
(45) Date of Patent: Oct. 29, 2013

(54) ARRANGEMENT WITH WATER BOX AND WATER DRAIN FOR A MOTOR VEHICLE

(71) Applicant: GM Global Technology Operations LLC, Detroit, MI (US)

(72) Inventors: Joachim Lacroix, Flonheim (DE); Joerg Schneider, Ruesselsheim (DE)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/646,774

(22) Filed: Oct. 8, 2012

(65) Prior Publication Data

US 2013/0088050 A1    Apr. 11, 2013

(30) Foreign Application Priority Data

Oct. 11, 2011 (DE) .......................... 10 2011 115 792

(51) Int. Cl.
*B62D 25/08* (2006.01)

(52) U.S. Cl.
USPC ........................................................ 296/192

(58) Field of Classification Search
USPC ................ 296/192, 208; 52/11; 454/147, 158
See application file for complete search history.

(56) References Cited

U.S. PATENT DOCUMENTS

| 4,235,298 A | * | 11/1980 | Sackett et al. | ............... | 180/68.3 |
| 5,230,547 A | * | 7/1993 | Koukal et al. | ............... | 296/192 |
| 2008/0246311 A1 | | 10/2008 | Hagino et al. | | |

FOREIGN PATENT DOCUMENTS

| DE | 102005011479 A1 | 9/2006 |
| DE | 602005002184 T2 | 6/2008 |
| EP | 1595771 A2 | 11/2005 |
| JP | 60045482 A | 3/1985 |
| JP | H09132026 A | 5/1997 |
| JP | 2005313692 A | 11/2005 |

OTHER PUBLICATIONS

German Patent Office, German Search Report for German Application No. 10 2011 115 792.5, dated May 23, 2012.
UK IPO, British Search Report for Application No. 1216141.0, dated Jan. 8, 2013.

* cited by examiner

*Primary Examiner* — Lori Lyjak
(74) *Attorney, Agent, or Firm* — Ingrassia Fisher & Lorenz, P.C.

(57) ABSTRACT

An arrangement of a water box and a drain is provided for draining off water from a region between a windshield and an engine hood in a motor vehicle. The water box can include a depression with an upwardly directed water-directing region. The drain can include a drain valve housing with a drain valve. The drain valve of the drain is arranged above the water-directing region.

14 Claims, 2 Drawing Sheets

ARRANGEMENT WITH WATER BOX AND WATER DRAIN FOR A MOTOR VEHICLE

CROSS-REFERENCE TO RELATED APPLICATION

This application claims priority to German Patent Application No. 10 2011 115 792.5, filed Oct. 11, 2011, which is incorporated herein by reference in its entirety.

TECHNICAL FIELD

This application pertains to an arrangement with a water box and a drain for draining off water from a region between a windshield and an engine hood in a motor vehicle.

BACKGROUND

A generic arrangement is known from DE 60 2005 002 184 T2. The water box is generally situated in front of a windshield directly beneath a cooling slot grid which is arranged between the engine hood and the windshield.

The water box usually has an air inlet for interior ventilation or respectively an air conditioning system. Air can be directed through the cooling slot grid and the water box into the air inlet. Water, which likewise arrives through the cooling slot grid, is drained off from the water box by means of a shut-off valve and an off-take arranged thereon.

If there is no water in the water box, the shut-off valve is closed. In this way, it prevents the air inlet from drawing air in from the off-take. Unpleasant odors can form through moisture in the off-take, which should not arrive into the air inlet.

Thus, it can be desirable to provide an arrangement of a water box and a drain which can be housed in a space-saving manner in the vehicle. In addition, other objects, desirable features and characteristics will become apparent from the subsequent summary and detailed description, and the appended claims, taken in conjunction with the accompanying drawings and this background.

SUMMARY

According to various aspects of the present disclosure, an arrangement of a water box and a drain is provided for draining off water from a region between a windshield and an engine hood in a motor vehicle, wherein the water box has an upwardly directed water-directing region, and wherein the drain has a drain valve housing with a drain valve, wherein the drain valve of the drain is arranged above the water-directing region.

Thereby, the drain is accommodated at a location at which in any case there must be sufficient space available for the draining off of water, namely in the water box itself. Thereby, installation space is gained, which is then available for other units.

According to one exemplary embodiment, the water box has a drain bore and the drain has a clip region, wherein the clip region is able to be clipped from the water-directing region into the drain bore. Through the fact that the drain is introduced from above, i.e. from the water-directing region into the water box and is fastened there, the mounting of the water box with the drain is simplified.

According to another exemplary embodiment, the clip region has a hose-holding groove, onto which a drain line is able to be mounted.

In one example, the drain line can be formed from a flexible hose. The drain line opens out at a suitable location on the vehicle floor and serves for the removal of water onto the ground.

According to one exemplary embodiment, the drain valve opens in the direction of flow and shuts off contrary to the direction of flow, whereby the water itself can open the shut-off valve and can be drained off from the water box. As an air inlet for interior ventilation is usually provided in the water box, it is ensured by the shutting off of the drain valve in the direction of the water box that no unpleasant odors are drawn in from the drain.

According to another exemplary embodiment, the drain valve is formed from a valve flap arranged pivotably on a pivot hinge.

The pivot hinge can be constructed so as to have very low friction, so that the drain valve can open easily.

According to another exemplary embodiment of the drain valve, the valve flap in the closed state lies against a sealing region and is inclined with respect to the vehicle vertical axis such that the valve flap can already be held in the closed state solely by its weight force.

In this way, in a simple manner without spring loading and hence without additional components, a usually closed drain valve can be produced. In addition, this exemplary embodiment has the advantage that the drain valve opens very easily and therefore already small amounts of water are sufficient in order to actuate it easily. Therefore, small amounts of water can also be effectively drained off from the water-directing region.

According to another exemplary embodiment, a turbocharger is arranged immediately adjoining the underside of the water box.

In one example, in the case of transverse-mounted in-line engines with an exhaust manifold directed towards the rear, it is necessary to keep as much installation space as possible free in the region between the exhaust manifold and the waterbox. Furthermore, through the water drain arrangement advantages are produced with regard to the heat removal of heat-intensive components such as the exhaust manifold and the turbocharger.

By the turbocharger being arranged in the region immediately beneath the water box, the waste heat can be utilized advantageously in order to dry the drain valve housing.

According to one exemplary embodiment, the sink region is arranged at a location of the water-directing region lying furthest down in a vehicle vertical axis. Thereby, gravity can be utilized for draining off water.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
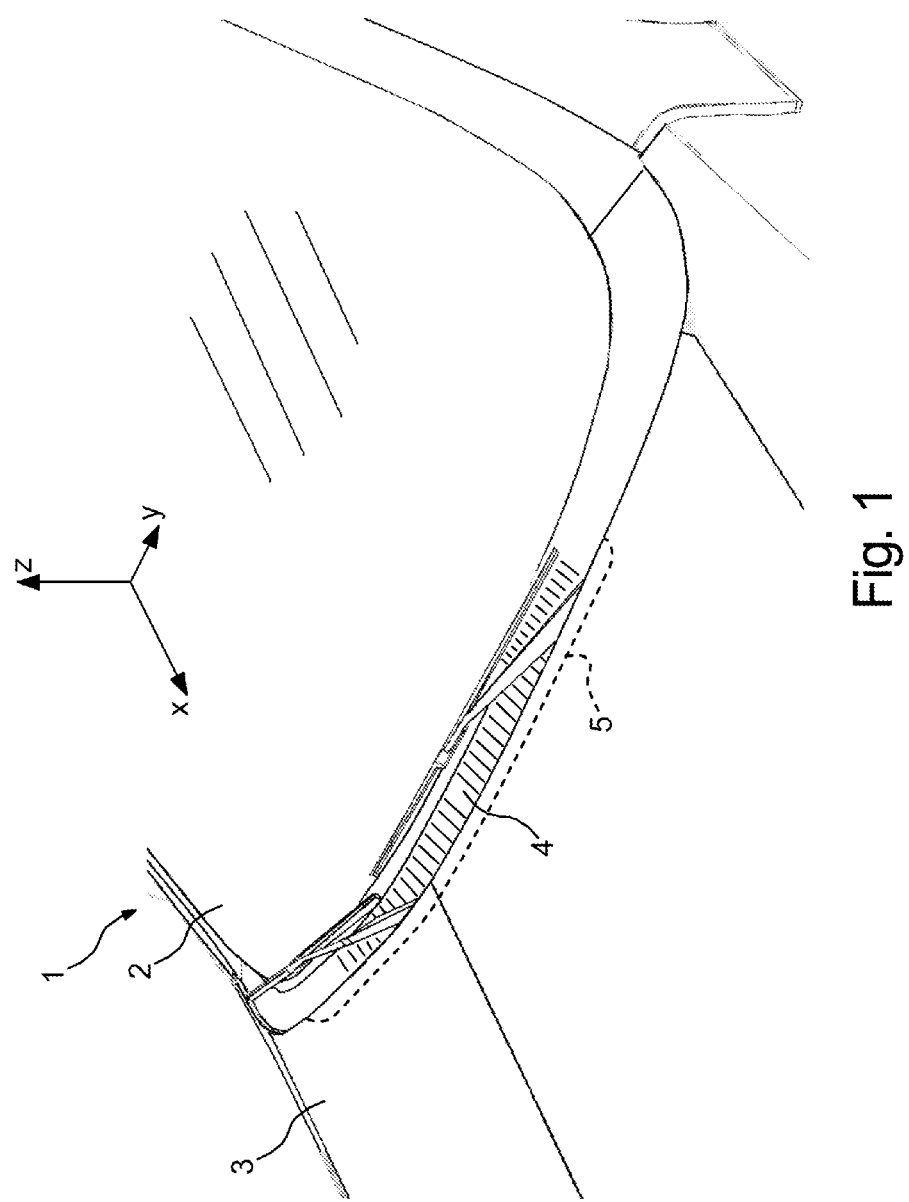
FIG. 1 is an exemplary portion of a vehicle front with a windshield and an engine hood.
Figure 2:
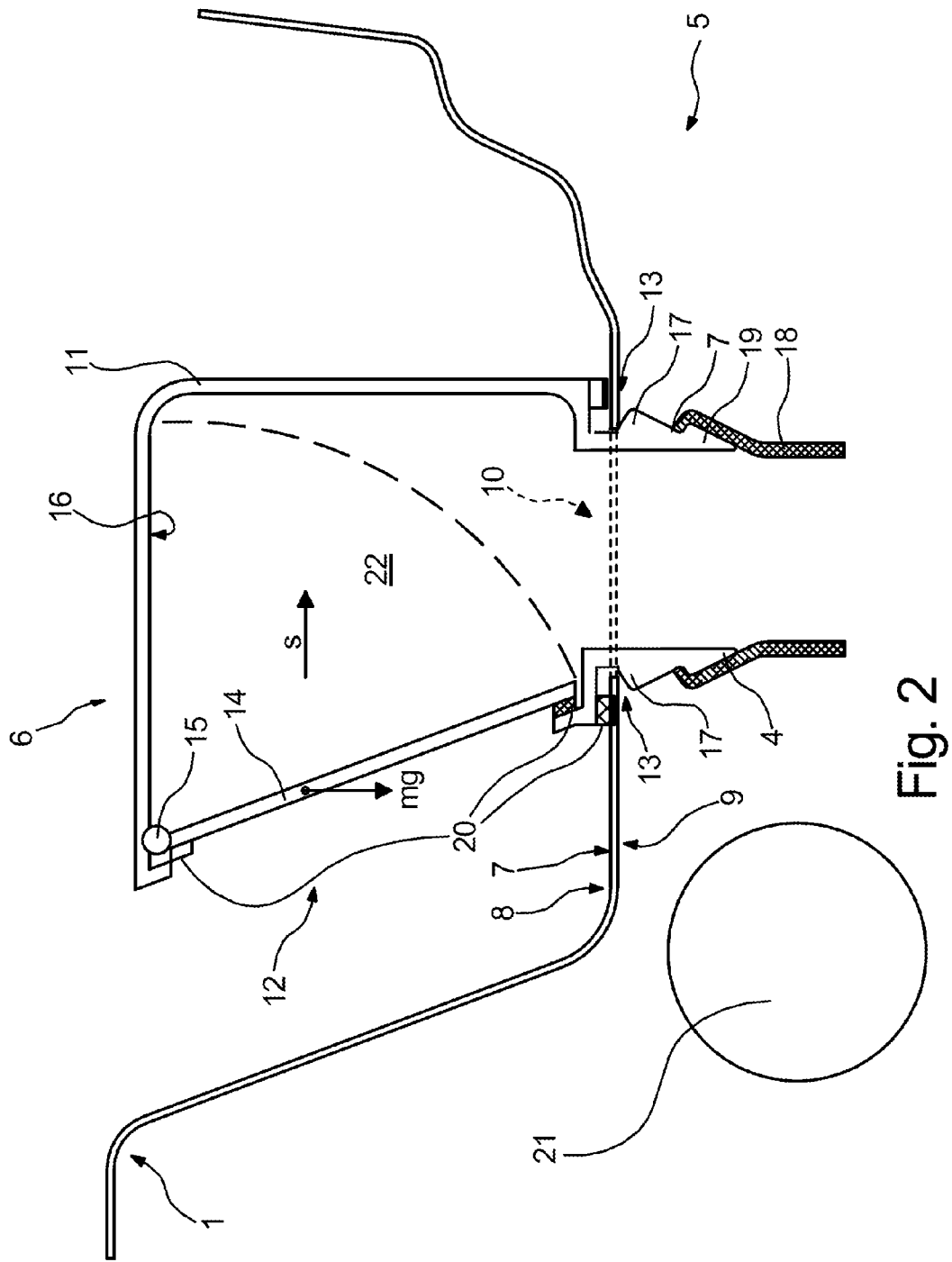
FIG. 2 is diagrammatically in a sectional view an exemplary water box with a drain.

FIG. 1 shows in a perspective illustration a portion of a motor vehicle 1 with a windshield 2 and an engine hood 3. A water deflector 4, which is permeable to air and water, is arranged between the windshield 2 and the engine hood 3. The water deflector 4 directs water to a water box, arranged beneath the water deflector 4, which FIG. 2 shows in a sectional view.

The water box 5 has a drain 6 for draining off water from a region between the windshield 2 and the engine hood 3.

The drain 6 is arranged in a deepest point of a depression 7 of the water box 5 and extends above this depression 7. The water box 5 has a water-directing region 8 directed upwards in a positive Z direction, and an underside 9 directed downwards in a negative Z direction, which in this embodiment forms an at least partially flat surface. An exemplary circular drain bore 10 is provided in the depression 7. In addition, a turbocharger 21 is arranged immediately adjoining the underside 9 of the water box.

The drain 6 is formed substantially from a drain valve housing 11 with a drain valve 12, which can be closed in so far as no water is situated in the water box, and with a clip region 13 penetrating the drain bore 10. The drain valve 12 is configured so that it can open in a flow direction S and always closes contrary to the flow direction S. The drain valve 12 has a valve flap 14. The valve flap 14 is pivotable at the top on a pivot hinge 15 and is applied in a fluid-tight manner. Circumferentially, the drain valve 12 has a sealing region 20, of which only a lower region is illustrated in FIG. 2 owing to the sectional representation. The valve flap 14 can be pivoted about a wide range up to an upper wall 16, so that a large amount of water can also be drained off from the water box 5.

The clip region 13 has an external peripheral detent groove 17, which deforms on pressing in of the drain valve housing 11, and in so doing penetrates the drain bore 10, and after penetrating the drain bore 10 snaps in on the underside 9 of the water box 5, thereby holding the drain valve housing 11 in position.

Alternatively, the drain bore 10 can also have contours deviating from a circular shape. For fastening a drain line 18, the drain valve 12 has in addition a hose-holding groove 19. A drain line 18, configured as a hose or as a preformed line part, can be mounted onto the hose-holding groove 19.

Owing to its own weight force mg, the valve flap 14 closes the interior 22 of the drain 6 with respect to the water box 5 when no water is to be drained off. The closing of the valve flap 14 is additionally assisted by a ventilation of the interior, which is not illustrated, the fan of which generates a slight underpressure in the water box 5.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An arrangement of a water box and a drain for draining off water from a region between a windshield and an engine hood in a motor vehicle, comprising:
   the water box including an upwardly directed water-directing region; and
   the drain including a drain valve housing with a drain valve, wherein the drain valve of the drain is arranged above the water-directing region.

2. The arrangement according to claim 1, wherein the water box has a drain bore and the drain has a clip region, which is able to be clipped from the water-directing region into the drain bore.

3. The arrangement according to claim 1, wherein the drain has a hose-holding groove, onto which a drain line is able to be mounted.

4. The arrangement according to claim 1, wherein the drain valve opens in the flow direction and shuts off contrary to the flow direction.

5. The arrangement according to claim 1, wherein the drain valve has a valve flap pivotably arranged on a pivot hinge.

6. The arrangement according to claim 1, wherein the valve flap in the closed state lies against a sealing region and is inclined with respect to the vehicle vertical axis so that it is held in the closed state by its weight force.

7. The arrangement according to claim 1, wherein a turbocharger is arranged immediately adjoining an underside of the water box.

8. The arrangement according to claim 1, wherein the depression is situated at a location of the water-directing region lying at the very bottom in a vehicle vertical axis.

9. A motor vehicle comprising:
   a windshield;
   a water box including an upwardly directed water-directing region located below the windshield;
   a turbocharger arranged immediately adjoining an underside of the water box; and
   a drain including a drain valve housing with a drain valve arranged above the water-directing region.

10. The motor vehicle according to claim 9, wherein the water box has a drain bore and the drain has a clip region, which is able to be clipped from the water-directing region into the drain bore.

11. The motor vehicle according to claim 9, wherein the drain has a hose-holding groove, onto which a drain line is able to be mounted.

12. The motor vehicle according to claim 9, wherein the drain valve opens in the flow direction and shuts off contrary to the flow direction.

13. The motor vehicle according to claim 9, wherein the drain valve has a valve flap pivotably arranged on a pivot hinge.

14. The motor vehicle according to claim 9, wherein the valve flap in the closed state lies against a sealing region and is inclined with respect to the vehicle vertical axis so that it is held in the closed state by its weight force.

* * * * *